United States Patent
Torongo

(10) Patent No.: US 7,128,328 B2
(45) Date of Patent: Oct. 31, 2006

(54) MECHANICAL STOP FOR A RIGID BAR

(75) Inventor: Daniel Thomas Torongo, Brighton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 434 days.

(21) Appl. No.: 10/782,424

(22) Filed: Feb. 18, 2004

(65) Prior Publication Data
US 2005/0180812 A1 Aug. 18, 2005

(51) Int. Cl.
B60G 21/055 (2006.01)
(52) U.S. Cl. ............... 280/124.107; 267/188; 280/124.166; 403/203; 403/282; 403/367; 403/372; 411/517; 411/521; 411/525; 411/526
(58) Field of Classification Search ......... 280/124.107, 280/124.106, 124.137, 124.149, 124.152, 280/124.166; 267/188, 189; 411/525, 526, 411/528, 529, 516, 517, 519–521, 535, 536, 411/543, 544; 403/194, 195, 197, 203, 243, 403/282, 365–369, 371, 372
See application file for complete search history.

(56) References Cited
U.S. PATENT DOCUMENTS 2,972,489 A    2/1961  Collier et al.
3,104,097 A    9/1963  Kozicki
3,140,378 A    7/1964  Benninghoff
5,056,975 A *  10/1991 Ando ................... 411/155
5,352,055 A   10/1994  Hellon et al.
5,630,609 A    5/1997  Shin
5,857,800 A    1/1999  Nell
6,123,352 A    9/2000  Muzio
6,255,631 B1   7/2001  Kichline, Jr. et al.
6,470,553 B1 * 10/2002  Retzbach ............... 29/450
6,631,543 B1 * 10/2003  Retzbach ............... 29/450
6,705,813 B1 *  3/2004  Schwab ............... 411/526
2002/0121733 A1 9/2002  Lewis et al.
2002/0149167 A1 10/2002 Wiesemann et al.

* cited by examiner

Primary Examiner—Eric Culbreth

(57) ABSTRACT

A mechanical stop is adapted to be mounted onto a rigid bar and includes a single piece conically shaped body having a plurality of inwardly extending projections. Each of the inwardly extending projections have a distal end that is contoured to match an outer surface of the bar. The distal ends define an opening. The conically shaped body is adapted to be plastically deformed to a substantially flat shape after being placed onto the rigid bar. The opening includes a first dimension larger than the rigid bar prior to being plastically deformed and a second dimension smaller than the rigid bar after being plastically deformed. After the conically shaped body is plastically deformed into a substantially flat shape, the distal ends will frictionally engage the outer surface of the rigid bar to secure the mechanical stop thereon.

12 Claims, 4 Drawing Sheets

MECHANICAL STOP FOR A RIGID BAR

BACKGROUND OF INVENTION

1. Technical Field of The Invention

The present invention generally relates to a mechanical stop adapted to be mounted onto a rigid bar or tube. More specifically, the present invention relates to a mechanical stop that is adapted to be plastically deformed into frictional contact with the outer surface of a rigid bar, thereby providing a mechanical stop on the rigid bar that does not create any stress risers within the rigid bar.

2. Description of the Prior Art

Many bars and tubes in machine and automotive components require a ring or clamp that fixes itself onto the bar or tube to create a mechanical stop. These types of mechanical stops can be formed in many ways. Often, the bar is machined to receive such a stop, or a stop is welded onto the bar or tube. Machining and welding of the bar or tube causes stress risers within the bar or tube, which are undesirable.

As seen from the above, there is a need for an improved mechanical stop that can be mounted onto a bar or tube without causing stress risers within the bar or tube. A principle object of this invention is to provide a mechanical stop that is frictionally attached to a bar or tube to provide a stop thereon.

SUMMARY OF THE INVENTION

The disadvantages of the prior art are overcome by providing a mechanical stop, in accordance with the present invention, in which the mechanical stop includes a single piece conically shaped body having a plurality of inwardly extending projections, each of the inwardly extending projections having a distal end, the distal ends defining an opening within the mechanical stop. The conically shaped body is adapted to be plastically deformed to a substantially flat shape after being placed onto a rigid bar. The opening has a first dimension prior to the conically shaped body being plastically deformed and a second dimension after the conically shaped body has been plastically deformed to a substantially flat shape.

The first dimension is larger than the rigid bar, such that the rigid bar will fit within the opening prior to plastic deformation, and the second dimension is smaller than the rigid bar, such that after said conically shaped body is plastically deformed into a substantially flat shape, the distal ends of the inwardly extending projections will frictionally engage the outer surface of the rigid bar to secure the mechanical stop thereon.

In an aspect of the present invention the distal ends of the mechanical stop include a flange extending therefrom to increase the amount of surface to surface contact between the mechanical stop and the rigid bar.

Another aspect of the present invention includes a method of mounting a mechanical stop onto a rigid bar including the steps of: placing a mechanical stop onto the rigid bar by inserting the rigid bar through the opening within the mechanical stop, plastically deforming the conically shaped body of the mechanical stop into a substantially flat shape such that the opening is reduced to a size that is smaller than the rigid bar, whereby the distal ends of the inwardly extending projections are forced into frictional engagement with the outer surface of the rigid bar.

In still another aspect of the present invention, the method includes the steps of: placing a second mechanical stop onto the rigid bar such that the distal ends of the inwardly extending projections of the mechanical stops abut one another; and plastically deforming the conically shaped bodies of the mechanical stops into a substantially flat shape such that the openings are reduced to a size that is smaller than the rigid bar, whereby the distal ends of the inwardly extending projections are forced into frictional engagement with the outer surface of the rigid bar, and the substantially flat mechanical stops are positioned adjacent one another on the rigid bar.

These aspects of the present invention provide a mechanical stop for a rigid bar that does not require machining or welding of the rigid bar, thereby allowing the mechanical stop to be mounted to the rigid bar without adding any stress risers to the rigid bar.

DETAILED DESCRIPTION OF THE PREFERRED EMBODIMENTS

Figure 1:
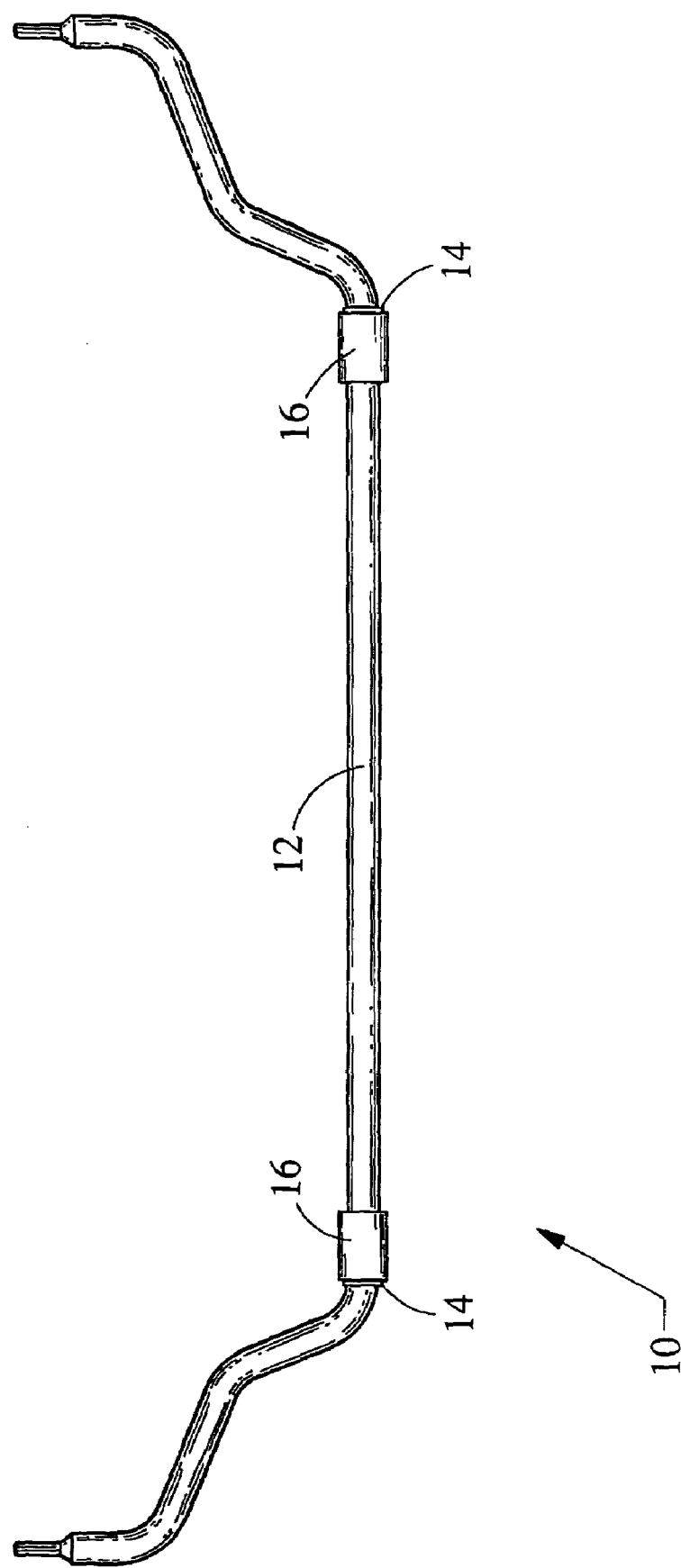
FIG. 1 is a plan view of a stabilizer bar of the present invention.

Referring to FIG. 1, a stabilizer bar assembly for an automotive vehicle having a mechanical stop of the present invention is generally shown at 10. The stabilizer bar assembly 10 includes a stabilizer bar 12 with at least one mechanical stop 14 mounted thereon. The stabilizer bar 12 further includes at least one bushing 16 mounted onto the stabilizer bar 12 adjacent the mechanical stop 14. The mechanical stop 14 is adapted to prevent the bushing from moving axially along the stabilizer bar 12. The stabilizer bar 12 is generally made from steel, and can be solid or hollow. It is to be understood, that the stabilizer bar 12 can be made from other suitable materials.

Figure 2:
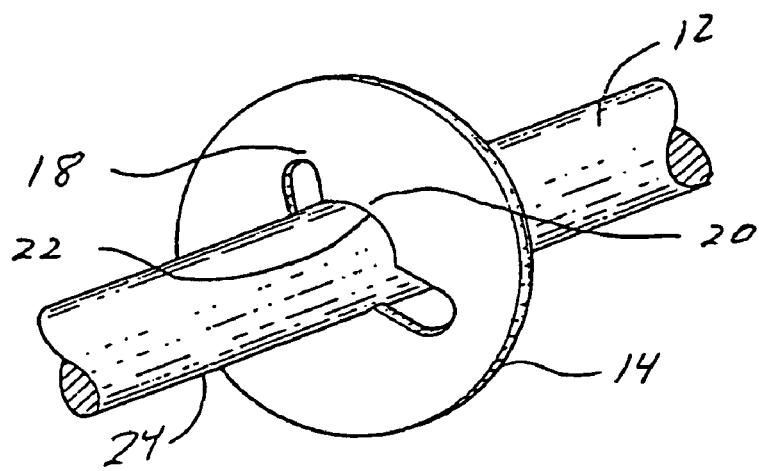
FIG. 2 is an enlarged view of the portion of the stabilizer bar shown in FIG. 1 enclosed by the circle numbered 2.
Figure 3:
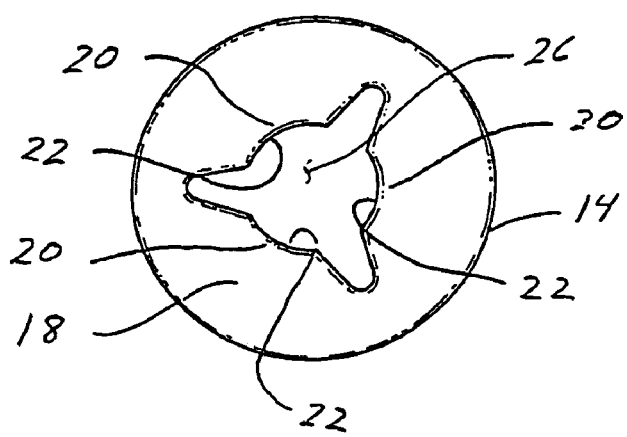
FIG. 3 is a top view of a mechanical stop of the present invention prior to being plastically deformed.
Figure 4:
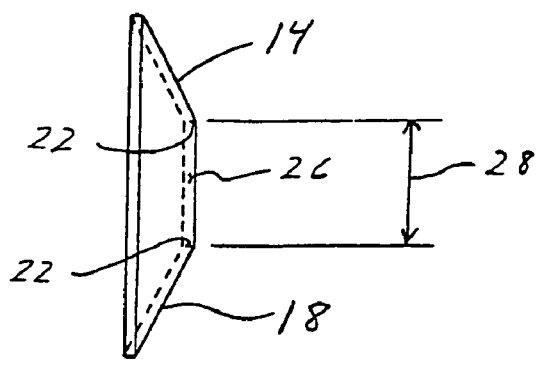
FIG. 4 is a side view of the mechanical stop of FIG. 3.

The mechanical stop 14 is shown generally in FIGS. 2, 3, and 4. The mechanical stop 14 includes a single piece conically shaped body 18 having a plurality of inwardly extending projections 20. Each of the inwardly extending projections 20 has a distal end 22 that is contoured to match an outer surface 24 of the stabilizer bar 12. The distal ends 22 of the inwardly extending projections 20 define an opening 26 through the mechanical stop 14.

Figure 5:
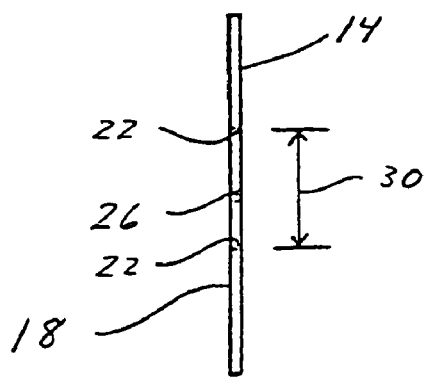
FIG. 5 is a side view of the mechanical stop of FIGS. 3 and 4 after being plastically deformed.

The conically shaped body 18 of the mechanical stop 14 is adapted to be plastically deformed to a substantially flat shape after being placed onto the stabilizer bar 12. The opening 26 has a first diameter 28 prior to the conically shaped body 18 being plastically deformed to a substantially flat shape, as shown in FIG. 4, and a second diameter 30 after the conically shaped body 18 has been plastically deformed to a substantially flat shape, as shown in FIG. 5.

The first diameter 28 is larger than the stabilizer bar 12, such that the stabilizer bar 12 will fit within the opening 26 prior to the conically shaped body 18 being plastically deformed. The second diameter 30 is smaller than the stabilizer bar 12, such that after said conically shaped body 18 is plastically deformed into a substantially flat shape, the distal ends 22 of the inwardly extending projections 20 will frictionally engage the outer surface 24 of the stabilizer bar 12 to secure the mechanical stop 14 thereon.

Figure 6:
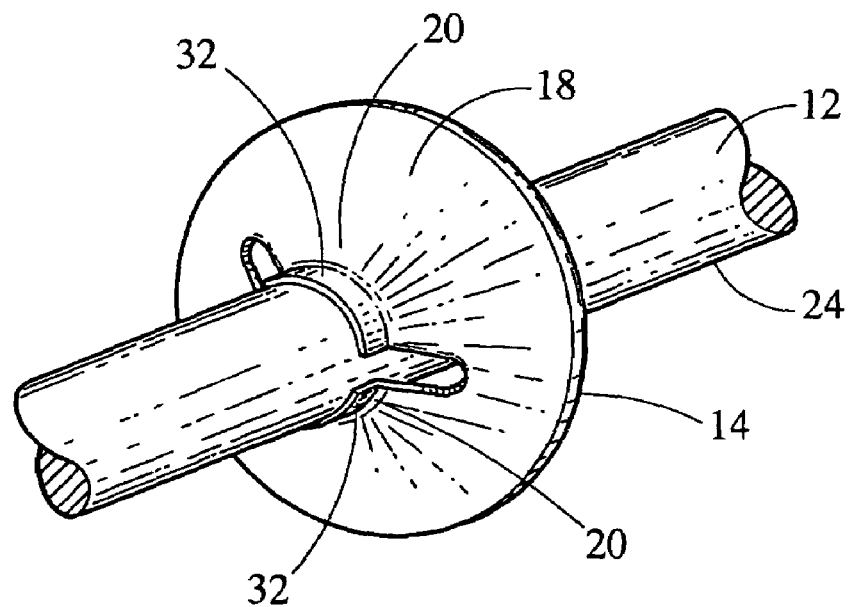
FIG. 6 is a view similar to FIG. 2 wherein the mechanical stop includes flanges extending from the distal ends of the inwardly extending projections.

Referring to FIG. 6, the mechanical stop 14 can include a flange 32 extending from distal ends 22 of the inwardly extending projections 20. The flange 32 will provide more surface to surface contact between the mechanical stop 14 and the outer surface 24 of the stabilizer bar 12 to keep the mechanical stop 14 more securely mounted onto the stabilizer bar 12. Preferably, the flange 32 extends axially from the distal ends 22 of the inwardly extending projections 20 such that the flange 32 extends annularly around and parallel to the stabilizer bar 12.

Figure 7:
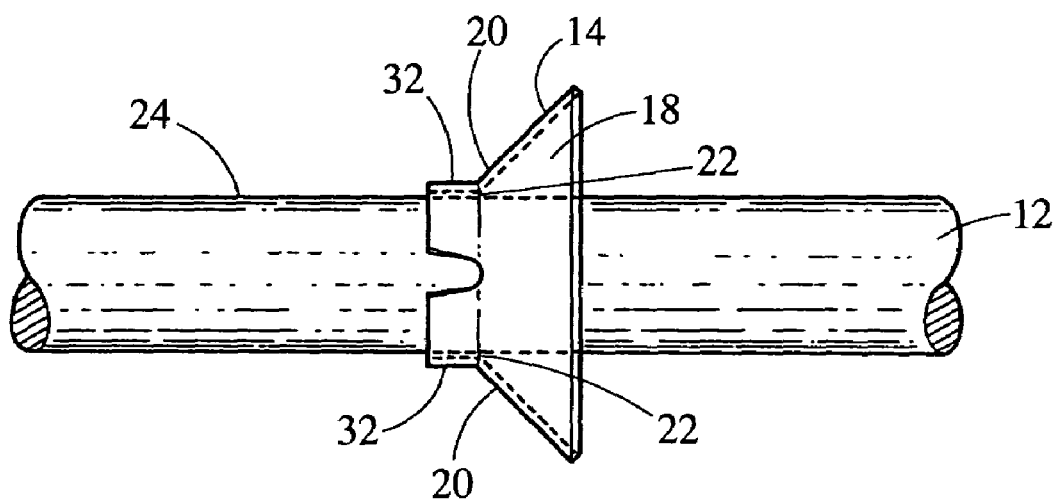
FIG. 7 is a side view of the mechanical stop being placed onto a rigid bar prior to being plastically deformed.
Figure 8:
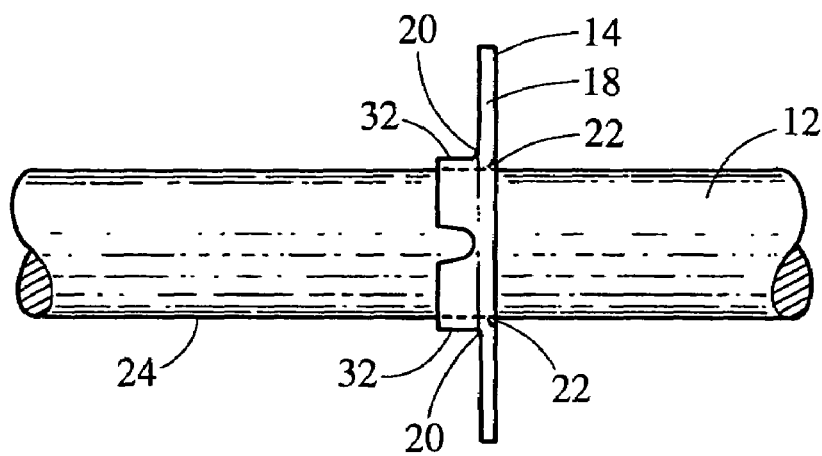
FIG. 8 is a side view of the mechanical stop after being plastically deformed onto a rigid bar.

Referring to FIGS. 7 and 8, the mechanical stop 14 is mounted onto the stabilizer bar 12 by placing the mechanical stop 14 onto the stabilizer bar 12 by inserting the stabilizer bar 12 through the opening 26 within the mechanical stop 14. Once the mechanical stop 14 is placed onto the stabilizer bar 12 at the desired location, the conically shaped body 18 of the mechanical stop 14 is plastically deformed into a substantially flat shape. When the conically shaped body 18 of the mechanical stop 14 is plastically deformed, the opening 26 is reduced from the first diameter 28 to the second diameter 30, whereby the distal ends 22 of the inwardly extending projections 20 are forced into frictional engagement with the outer surface 24 of the stabilizer bar 12.

Figure 9:
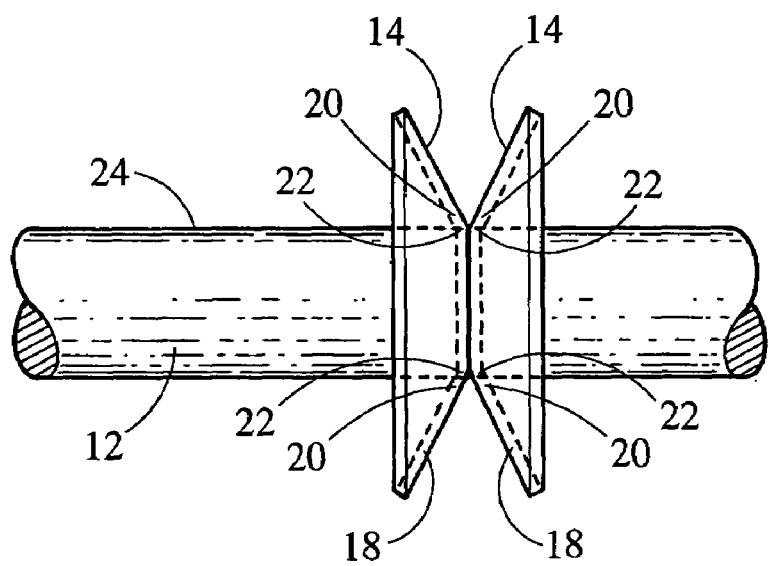
FIG. 9 is a side view of a pair of mechanical stops being placed adjacent to one another on a rigid bar prior to being plastically deformed.
Figure 10:
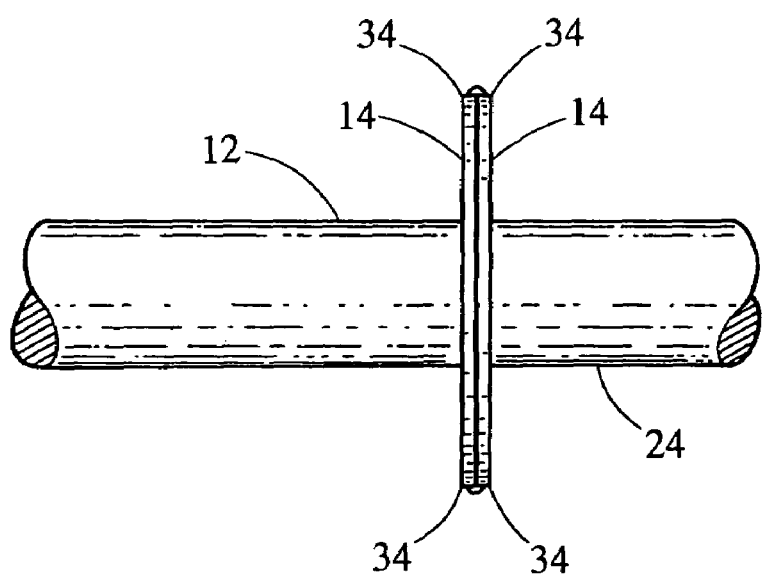
FIG. 10 is a side view of a pair of mechanical stops after being plastically deformed adjacent to one another on a rigid bar.

Referring to FIGS. 9 and 10, alternatively, two mechanical stops 14 can be placed onto the stabilizer bar 12 to provide a more robust support. As shown in FIG. 9, two mechanical stops 14 are placed onto the stabilizer bar 12 such that the distal ends 22 of the inwardly extending projections 20 of the first and second mechanical stops 14 abut one another. After placing the mechanical stops 14 onto the stabilizer bar 12, the mechanical stops 14 are plastically deformed into a substantially flat shape such that the openings 26 are reduced from the first diameter 28 to the second diameter 30, whereby the distal ends 22 of the inwardly extending projections 20 are forced into frictional engagement with the outer surface 24 of the stabilizer bar 12. The substantially flat mechanical stops 14 are positioned adjacent one another on the stabilizer bar 12.

To add further strength to the stabilizer bar assembly 10, outer edges 34 of the mechanical stops 14 may be fastened to one another. As shown in FIG. 10, the edges 34 of the mechanical stops 14 are spot welded to one another, however it is to be understood that other suitable means of attachment could be utilized within the scope of the present invention.

The foregoing discussion discloses and describes the preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. A mechanical stop adapted to be mounted onto a rigid bar comprising;
   a single piece conically shaped body having a plurality of inwardly extending projections;
   each of said inwardly extending projections having a distal end that is contoured to match an outer surface of the bar, said distal ends of said inwardly extending projections defining an opening;
   said conically shaped body being adapted to be plastically deformed to a substantially flat shape after being placed onto the rigid bar, said opening having a first dimension prior to said conically shaped body being plastically deformed to a substantially flat shape and a second dimension after said conically shaped body has been plastically deformed to a substantially flat shape; and
   said first dimension being larger than the rigid bar, such that the rigid bar will fit within said opening prior to said conically shaped body being plastically deformed, and said second dimension being smaller than the rigid bar, such that after said conically shaped body is plastically deformed into a substantially flat shape, said distal ends of said inwardly extending projections will frictionally engage the outer surface of the rigid bar to secure said mechanical stop thereon;
   wherein said distal ends of said inwardly extending projections each include a flange to provide more surface to surface contact between said mechanical stop and said rigid bar.

2. The mechanical stop of claim 1 wherein said flange extends axially from said distal ends of said inwardly extending projections such that said flange extends annularly around and parallel to the rigid bar when the rigid bar is inserted within said opening.

3. The mechanical stop of claim 1 wherein said conical body is substantially round and said distal ends of said inwardly extending projections are adapted to engage a substantially round rigid bar, said opening defining a first diameter prior to said conically shaped body being plastically deformed to a substantially flat shape and a second diameter after said conically shaped body has been plastically deformed to a substantially flat shape, said first diameter being larger than the rigid bar, thereby allowing the rigid bar to fit within said opening prior to said conically shaped body being plastically deformed, and said second diameter being smaller than the rigid bar, such that after said conically shaped body is plastically deformed into a substantially flat shape, said distal ends of said inwardly extending projections will frictionally engage the outer surface of the rigid bar to secure said mechanical stop thereon.

4. A method of mounting a mechanical stop onto a rigid bar comprising:
   providing a rigid bar;
   providing a first mechanical stop having a single piece conically shaped body with a plurality of inwardly extending projections, wherein each of the inwardly extending projections has a distal end that is contoured to match an outer surface of the rigid bar, the distal ends of the inwardly extending projections defining an opening that is larger than the rigid bar such that the rigid bar can be inserted within the opening;
   placing the first mechanical stop onto the rigid bar by inserting the rigid bar through the opening within the mechanical stop;

plastically deforming the conically shaped body into a substantially flat shape such that the opening is reduced to a size that is smaller than the rigid bar, whereby the distal ends of the inwardly extending projections are forced into frictional engagement with the outer surface of the rigid bar.

5. The method of claim 4 wherein said distal ends of the inwardly extending projections each include a respective flange extending therefrom to provide more surface area contact between the mechanical stop and the rigid bar.

6. The method of claim 5 wherein each said respective flange extends axially from said distal ends of said inwardly extending projections such that each said respective flange extends annularly around and extends parallel to the rigid bar when the rigid bar is inserted within said opening.

7. The method of claim 4 further including: providing a second mechanical stop having a single piece conically shaped body with a plurality of inwardly extending projections, wherein each of the inwardly extending projections has a distal end that is contoured to match an outer surface of the rigid bar, the distal ends of the inwardly extending projections defining an opening that is larger than the rigid bar such that the rigid bar can be inserted within the opening; placing the second mechanical stop onto the rigid bar by inserting the rigid bar through the opening within the mechanical stop such that the distal ends of the inwardly extending projections of the first and second mechanical stops abut one another; plastically deforming the conically shaped bodies of the first and second mechanical stops into a substantially flat shape such that the openings are reduced to a size that is smaller than the rigid bar, whereby the distal ends of the inwardly extending projections are forced into frictional engagement with the outer surface of the rigid bar, and the substantially flat mechanical stops are positioned adjacent one another on the rigid bar.

8. The method of claim 7 further including fastening the first and second mechanical stops to one another.

9. The method of claim 8 wherein fastening the first and second mechanical stops to one another includes welding the first and second mechanical stops to one another.

10. A stabilizer bar assembly for an automotive vehicle comprising: a stabilizer bar;

a bushing mounted to said stabilizer bar;

a mechanical stop mounted onto said stabilizer bar adjacent said bushing and adapted to provide a stop to prevent said bushing from moving axially in a unilateral direction along said stabilizer bar; said mechanical stop including a single piece conically shaped body having a plurality of inwardly extending projections, each of said inwardly extending projections having a distal end that is contoured to match an outer surface of said stabilizer bar, said distal ends of said inwardly extending projections defining an opening;

said conically shaped body being adapted to be plastically deformed to a substantially flat shape after being placed onto said stabilizer bar, said opening having a first diameter prior to said conically shaped body being plastically deformed to a substantially flat shape and a second diameter after said conically shaped body has been plastically deformed to a substantially flat shape;

said first diameter being larger than said stabilizer bar, such that said stabilizer bar will fit within said opening prior to said conically shaped body being plastically deformed, and said second diameter being smaller than said stabilizer bar, such that after said conically shaped body is plastically deformed into a substantially flat shape, said distal ends of said inwardly extending projections will frictionally engage said outer surface of said stabilizer bar to secure said mechanical stop thereon.

11. The stabilizer bar of claim 10 wherein said distal ends of said inwardly extending projections of said mechanical stop each include a respective flange to provide more surface to surface contact between said mechanical stop and said stabilizer bar.

12. The stabilizer bar of claim 11 wherein each said respective flange extends axially from said distal ends of said inwardly extending projections such that said flange extends annularly around and parallel to the stabilizer bar.

* * * * *